Jan. 3, 1939.  F. B. LLEWELLYN  2,142,138
GUIDED WAVE TRANSMISSION
Filed Oct. 3, 1935  3 Sheets-Sheet 1

INVENTOR
F. B. LLEWELLYN
BY
ATTORNEY

Jan. 3, 1939.  F. B. LLEWELLYN  2,142,138
GUIDED WAVE TRANSMISSION
Filed Oct. 3, 1935  3 Sheets-Sheet 2

INVENTOR
F. B. LLEWELLYN
BY
ATTORNEY

Jan. 3, 1939.  F. B. LLEWELLYN  2,142,138
GUIDED WAVE TRANSMISSION
Filed Oct. 3, 1935  3 Sheets-Sheet 3
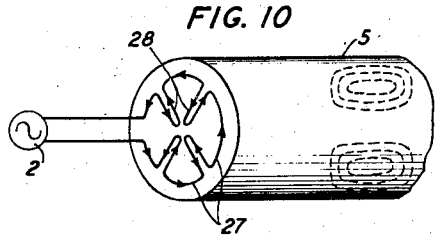
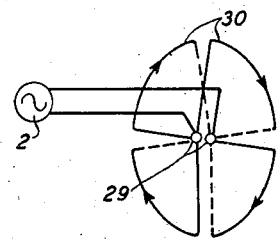
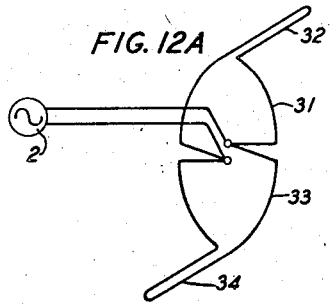
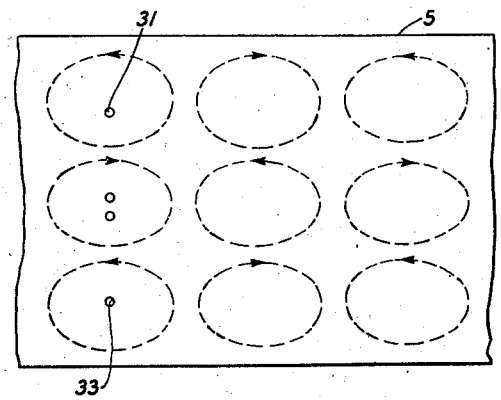
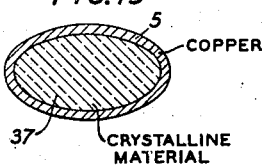
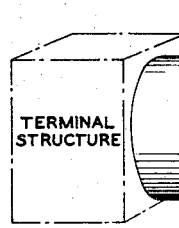
INVENTOR
F. B. LLEWELLYN
BY
ATTORNEY Patented Jan. 3, 1939

2,142,138

UNITED STATES PATENT OFFICE 2,142,138

GUIDED WAVE TRANSMISSION

Frederick B. Llewellyn, Montclair, N. J., assignor to Bell Telephone Laboratories, Incorporated, New York, N. Y., a corporation of New York Application October 3, 1935, Serial No. 43,302

10 Claims. (Cl. 178—44)

This invention relates to systems for the transmission of electromagnetic waves along wave guides.

Heretofore it has been shown that electromagnetic waves of high frequency, suitably introduced into a rod of dielectric material, are propagated along the rod and may be the means for conveying energy from one place to another. It has also been shown that the same phenomena may be obtained by the use of a conducting pipe or sheath instead of the dielectric rod. A dielectric rod or metallic pipe or any other means in which electromagnetic waves are propagated in substantially the same manner is denominated generically in this specification as a wave guide.

An object of the invention is to increase the efficiency with which energy is transferred to and from a wave guide and its associated terminal circuits. Another and more particular object is to facilitate the production of guided waves of several specific types.

One of the features of the invention is, in specific form, a pair of coaxial cones interconnecting a wave guide and a two-wire terminal circuit.

The invention is further featured by the use of reflectors in combination with a metallic pipe guide and the terminal circuits associated therewith.

The foregoing objects and features will be explained with reference to the specific embodiments of the invention illustrated in the accompanying drawings. Other objects, features, and advantages will be set forth hereinafter. The scope of the invention is indicated in the appended claims.

In the drawings:

Figs. 10, 11, 12A and 12B show schematically terminal structures adapted to produce a particular type of guided wave; and Figs. 13 to 15 represent wave guides characterized by a crystalline dielectric.

Figure 1A:
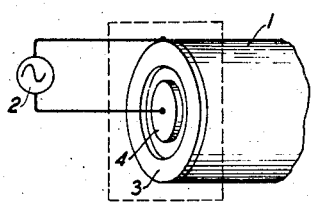
Figs. 1A, 1B and 1C represent a typical guided wave system known heretofore.

Referring to Fig. 1A there is illustrated schematically a typical wave guide and associated terminal circuit. The guide 1 is shown as a hollow cylinder of conducting material, copper, for example, filled with a dielectric which may be solid, liquid or gaseous; air, for example. A source 2 of high frequency alternating current is connected to the concentric, coplanar electrodes 3 and 4 which are fixed to the end of the guide 1 and at right angles to its axis. The source 2 may be, for example, the terminal circuits of a wide band carrier signaling system but for present purposes it may be considered simply as a generator of a sinusoidal wave.

Figure 1B:
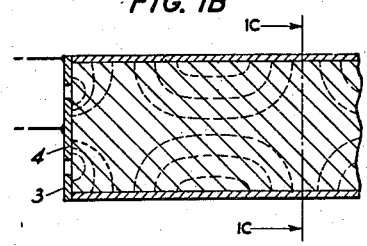
Figure 1C:
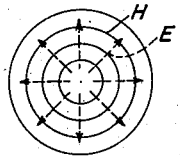

At any frequency above a critical "cut-off" frequency $f_c$ determined by the diameter, dielectric constant and permeability of the guide, waves detach themselves from the terminal electrodes and are propagated down the guide. Figs. 1B and 1C depict the respective electric and magnetic field components of a typical wave. The lines of magnetic force are closed circular loops concentric with the axis of the conductor and lying in planes at right angles to that axis and to the direction of propagation. The lines of electric force form loops lying in planes passing through the axis of the conductor. The magnetic vector H, therefore, lies in the wave front at right angles to the electric vector E and to the direction of propagation. Any wave in which the magnetic vector H is perpendicular to the direction of wave propagation, as in the case illustrated, will be designated hereinafter as a transverse magnetic or TM wave. In a similar way, a wave in which the electric vector E is perpendicular to the direction of wave propagation, as would be the case if E and H were interchanged in the illustration, will be designated hereinafter as a transverse electric or TE wave.

Figure 2:
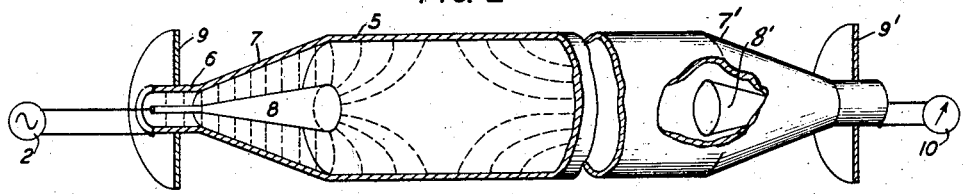
Figs. 2 to 9 show various means devised by applicant for introducing energy into and withdrawing energy from a wave guide.

In Fig. 2 is illustrated a feature of the present invention which constitutes an improvement over the arrangement shown in Fig. 1 for terminating the guide. The arrangement shown in Fig. 1 is open to the objection that substantial radiation loss may arise at the junction of the wave guide and the terminal conduction current circuit. The loss is greatly reduced by employing the arrangement shown in Fig. 2. One terminal of source 2 is connected through the inner conductor of a short coaxial conductor line 6 to the tip of a cone 8 of conducting material, the axis of which coincides with the axis of the guide extended. The other terminal is connected through the outer conductor of the coaxial line 6 to the small end of a conducting frusto-conical member 7 which is coaxial with cone 8 and the larger end of which is joined in any suitable manner to the conducting tube 5 which comprises the guide. It is not essential that the larger end of cone 7 be exactly equal in diameter to the conducting tube 5, but to prevent radiation in this case the larger end of 7 may be joined to 5 by an annular conducting disc. A similar pair of conical members 7', 8' is employed at the other end of the guide to connect the guide with the detector or receiver 10.

When waves from source 2 reach the conical members 7 and 8, no severe reflection of the waves is encountered. In fact, if the ratio of the diameters of the large ends of cones 7 and 8 is adjusted to match the impedance of the wave guide while the ratio of the diameters of the small ends of the same two cones is adjusted to match the impedance of the external circuit 2, the conical members 7 and 8 perform the function of an impedance transformer. The electromagnetic field expands gradually and symmetrically during its traverse of the cones, and any reflection phenomenon is light. As the field reaches the large ends of the cones, waves detach themselves and are propagated along the guide. Similarly at the receiving end the guided waves meet with only gradual changes in impedance.

As long as the distance between the inner and outer cones remains less than 0.2 of the wavelength, the diameter of the large end of the inner cone 8 is immaterial. The impedance looking into the small end of the cones is approximately equal to the surge impedance of a concentric transmission line having the same diameter ratio, namely $$Z = 138 \log_{10} \frac{d_7}{d_8} \text{ ohms} \tag{1}$$

where $d_7$ and $d_8$ are the diameters of the small ends of the cones 7 and 8 or of the concentric conductors 6.

The formula (1) holds when the length of the wave guide is theoretically substantially infinite or when the guide is terminated by a pair of concentric cones ending in an impedance also given by (1).

The large discs 9 and 9' mounted on the short tubular sections tend to reduce radiation losses in going from the open external circuit to the concentric system 6, or vice versa.

It has been found possible to convert a greater proportion of the power output of generator 2 into guided wave form by placing the generator within the guide and thus avoiding radiation losses. To determine an optimum arrangement of the apparatus, experiments were conducted with the wave guide system shown in Fig. 3, which comprises an 11¼ inch cylinder 5 of $\frac{1}{32}$ inch sheet copper 8 feet long and a receiving end termination comprising a pair of coaxial cones each 12 inches long, the inner cone 4½ inches outside diameter at the large end, and the outer cone $\frac{5}{16}$ inch inside diameter at the small end. The output circuit comprises a two-wire transmission line 12 terminated by a short-circuiting copper disc 13 and a lamp load 14 bridged across the transmission line. The positions both of the lamp and of the disc are variable. The test oscillator 15 may be of the spiral grid Barkhausen type having a frequency of the order of 1000 megacycles per second.

To establish a basis for comparing the various types of terminating equipment tested, the oscillator was calibrated by connecting to it a small lamp. The output power was measured by comparing the brilliancy of this lamp with that of a similar lamp operated on direct current.

Figure 3:
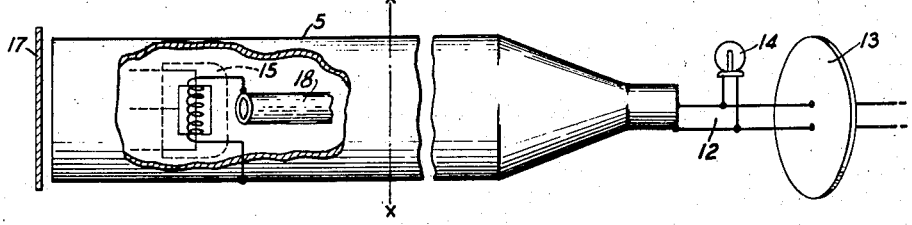

The entire oscillator was then inserted within the guide 5 and a four foot section of ¼ inch copper tubing 18 was placed along the axis of the guide as shown in Fig. 3. One end of the tube grid of the oscillator was connected to the tube while the other end of the grid was connected by a radial wire to the guide 5. This arrangement with a plane reflector 17 at the open end gave an output power of 200 milliwatts.

Figure 4:
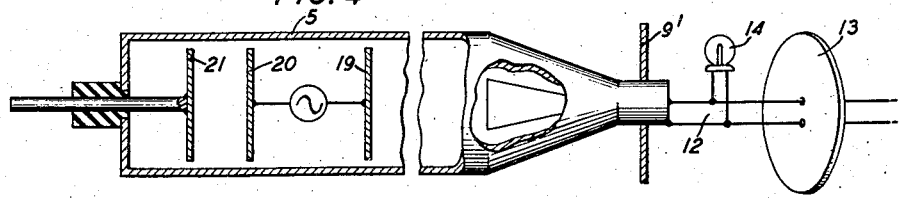

The arrangement which was found to give the best results with the oscillator located within the pipe is shown in Fig. 4. Each side of the grid of the oscillator tube was connected to a large copper disc 19, 20 which was completely insulated from the copper pipe 5 and placed perpendicular to its axis. The diameter of the discs was about two-thirds of the pipe diameter for best results but was not critical. The power leads to the oscillator are preferably shielded and all drawn in through a small copper tube fastened to the inside of the copper pipe. When this small tube was extended into the pipe more than 30 centimeters, very little radio frequency energy was carried away in the power leads. One end of the large pipe 5 was closed by a removable copper cap through which a small copper rod attached to copper disc 21 was free to slide. This arrangement permits the effective length of the guide to be varied readily. At the other end of the pipe was connected the terminal structure and output circuit described with reference to Fig. 3. With this arrangement 400 milliwatts was obtained in the load.

The operation of the combination shown in Fig. 4 may be described as follows: The electric field between the oscillator discs 19 and 20 radiates power in both directions. If the impedance looking into the receiving end terminating cones is in accord with equation (1), all electromagnetic waves striking the cones will be guided by them out to the load. As the surge impedances of the pipe, cones and line 12 may be unequal, partial reflections occur at several points before all the energy is absorbed by the lamp load. Some of this reflected energy tends to go back over the outside of the copper pipe and to prevent this the large copper shield 9' is fastened to the outer cone, as shown. Since the impedance looking into the guide at the receiving end is matched, all of the energy is finally absorbed in the lamp load after a series of reflections.

If the effective length of the copper pipe is correctly adjusted by means of the disc 21, a portion of the electromagnetic waves reflected by the plunger disc 21 will arrive in phase with the direct waves at the receiving terminal. The presence of the copper discs 19 and 20 on the oscillator causes a series of reflections between the plunger and these discs which creates an optimum position of the oscillator unit inside the pipe for maximum output.

Figure 5:
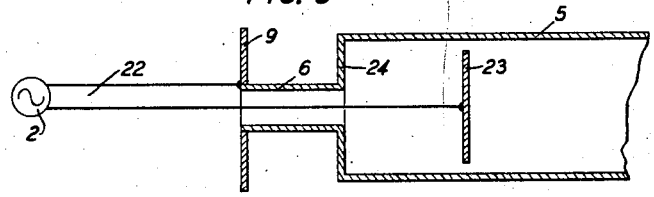

In the circuit shown in Fig. 5 the oscillator 2 was connected through the telescopic Lecher wire line 22 and a short section of coaxial conductor line 6 to the discs 23 and 24. Disc 24 comprised a flat copper cap on the end of the pipe 5 whereas disc 23 was mounted on a plunger which passed through the disc 24. A large copper shield 9 was connected to the outer conductor at the left-hand end of the coaxial line. Maximum output was obtained when disc 23 was about 20 centimeters in diameter. The position of this disc along the axis of the pipe was not found to be critical, whereas the length of the Lecher line 22 was.

Figure 6:
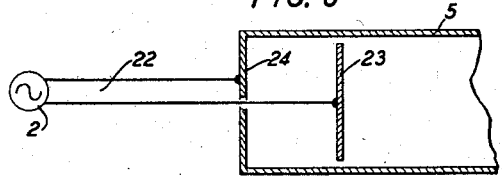

The coaxial line 6 may be omitted, as shown in Fig. 6. In this case the disc 23 may be connected to the Lecher wire system 22 through a large hole in the copper cap on the end of the pipe. As the size of the opening in the cap is increased this arrangement approaches that shown in Fig. 7.

Figure 7:
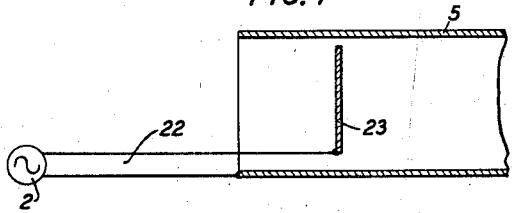

In the combination shown in Fig. 7 the input comprised a Lecher wire system 22 connected between the pipe 5 and a disc 23 mounted in any suitable manner within the pipe and at right angles to its axis. The length of the Lecher wire system and the position of the disc 23 were critical. Maximum output was obtained when the disc 23 was approximately a half wave-length from the open end of the pipe. A plane reflector was found approximately to double the output power.

Figure 8:
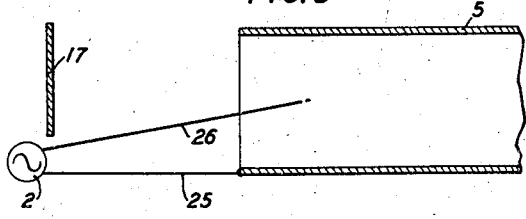

A further modification of the terminal circuit is illustrated in Fig. 8. In this case the oscillator 2 was connected by a V transmission line comprising conductor 25 which was connected to the pipe 5 and conductor 26 which projected into the open end of the pipe a few centimeters. The angle between conductors 25 and 26 of the V transmission line and the length of the line were critical depending on the input impedance of the guide 5. A plane reflector 17 was again found to increase the power output.

Figure 9:
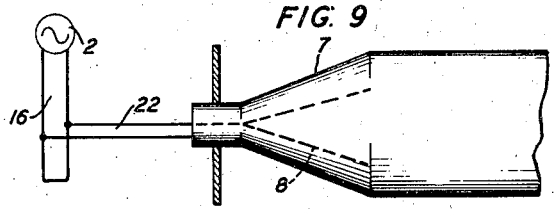

In the modification shown in Fig. 9 the short length of Lecher wire 22 leading to the concentric cones 7, 8 was connected to the Lecher system 16 of the oscillator instead of directly to the electrodes of the oscillator tube, in order to obtain impedance matching. The oscillator Lecher wires 16 are preferably arranged at right angles to the axis of the guide, as indicated, in order to minimize stray coupling. The length of the line 22 has very little effect on the output.

Terminal apparatus for producing transverse electric waves are shown in Figs. 10 and 11. This type of wave is similar to the transverse magnetic waves represented in Figs. 1B and 1C but the electric field and the magnetic field are interchanged. That is, the lines of electric force may be represented by concentric circles the planes of which are transverse to the axis of the guide, and the lines of magnetic force may be represented by loops lying in planes containing the axis of the guide 5. These two types of waves have different propagation characteristics which, however, require no explanation for an understanding of the present invention.

Referring now to Fig. 10, the terminal electrode connected to the high frequency source 2 comprises a plurality of arcuate conducting members 27 disposed in a circle perpendicular to the axis of the tubular conducting guide and connected in series by means of radially extending conducting loops 28. The loops and arcuate portions are of such respective lengths with reference to the wave-length of the frequency transmitted that the current in the arcuate portions is all in the same circular sense. Thus the radial loops operate as phase shifting devices. In the extreme case, the length of each arcuate portion would be exactly one-half wave-length, and the phase shift in each loop would be 180 degrees. The electrode structure is preferably so designed that the current in one leg of each loop is exactly opposite in phase to the current in the other leg of the loop. Although the loops have been shown as being radial this is not an essential feature.

Another combination for establishing transverse magnetic waves is illustrated in Fig. 11. The signal source 2 is connected to a pair of electrodes 29, preferably axially positioned as shown, to which in turn the arcuate members 30 are connected in parallel. In this case, the radial connectors provide the required phase shift, so that there is at every instant a unidirectional flow around the circle in which members 30 lie. The diameter of the latter circle and the number of arcuate members may be varied subject to the restrictions imposed by the purpose of the combination.

Figs. 12A and 12B show a type of terminal electrode structure adapted to produce a transverse electric wave of higher mode than the fundamental just described. Two semi-circular current loops, parallel connected in the specific example set forth, are provided, one comprising the arcuate conducting member 31 and the intermediate phase adjusting loop 32 and the other comprising similar members 33 and 34. The accompanying field diagram indicates the direction of the magnetic field produced. The phase adjusting loops 32 and 34 are adjusted so that at all points in each semicircular path the current direction is in the same sense.

One of the properties of a wave guide is illustrated by the fact that if $$\frac{9.10^{20}\xi^2}{\omega^2 \epsilon \mu a^2} > 1$$

where $a$ is the radius of the guide in centimeters, $\mu$ is the permeability and $\epsilon$ is the dielectric constant of the material filling the wave guide, and $\xi$ is a constant determined by the type of wave propagation, then the impedance of the guide becomes imaginary. This means physically that the guide refuses to transmit energy from a wave of a given frequency when the radius of the guide is less than the value required to keep the impedance real. If the guide is filled with or composed of a substance having a high dielectric constant, then a smaller pipe than would otherwise be required may be used for a given frequency, so that it is advantageous to employ a dielectric having as high a dielectric constant as possible, but having at the same time as low losses as possible in order to avoid attenuation of the waves transmitted along the guide.

It is found that crystalline substances possess just this property of high dielectric constant and low losses. It is therefore advantageous to employ such crystals as the dielectric in wave guides.

As an illustration, crystalline quartz having extremely low losses may be employed. If the dielectric is composed of a crystal of quartz disposed with its optic axis parallel to the axis of the wave guide, or if the dielectric is composed of a number of crystals of quartz all disposed with their optic axes parallel to the axis of the wave guide then energy may be propagated symmetrically along a guide of much smaller diameter than would otherwise be required.

Most crystals have the property that their dielectric constants are different in different directions. It therefore becomes advantageous, in order to make the fullest use of the high dielectric constant of crystals, to orient individual crystals comprising the dielectric of a wave guide so that the greatest value of dielectric constant lies in a direction perpendicular to the axis of the wave guide. However, even in the case where powdered crystals are employed with random orientations, the effective dielectric constant of the aggregate is substantially greater than that of air, or of most other dielectrics having comparable losses so that a material decrease is secured in the required diameter of a wave guide filled with, or composed of such a dielectric.

Fig. 13 illustrates a section of wave guide 5 composed entirely of a crystalline material 35 and Fig. 14 illustrates a section of wave guide composed of a hollow metallic cylinder 5 filled with a crystalline material 36.

Fig. 15 is a cross-section of a wave guide composed of a copper pipe 5 filled with a crystalline material 37, and having a cross-section shaped to correspond with the variations of the crystalline dielectric constant in different directions and thus to preserve symmetry in the wave propagation. Thus, the dielectric constant in a given direction being $\epsilon$, the radius of the pipe in that direction is made proportional to $$1/\sqrt{\epsilon.}$$

Methods of introducing electromagnetic energy into the guides shown in Figs. 13 to 15 may be the same as though the dielectric were non-crystalline, and Figs. 1 to 12 inclusive illustrate suitable means.

What is claimed is:

1. A metallic pipe comprising a guide for electromagnetic waves of a character such that the guide presents to them the characteristics of a high-pass filter and a terminal structure for said guide comprising a pair of tapered metallic members disposed coaxially one within the other with their larger ends juxtaposed and with the larger end of the outer of said members in continuation of said pipe.

2. In combination, a transmission line having a metallic shield, a wave guide for the transmission of electromagnetic waves of such character that transmission occurs only at frequencies above a critical frequency dependent on a transverse dimension of said guide, and means coupling said line and said guide in energy transfer relation comprising a flaring metallic extension of said shield and an electrode therein for interconverting conduction currents in said line and the waves in said guide.

3. In combination, a transmission line comprising a pair of coaxial conductors, a wave guide comprising a metallic pipe and a coupling between said line and said pipe, said coupling comprising a flaring metallic extension of the outer of said coaxial conductors, said extension being at its larger end in substantial continuation of said pipe, and a circularly symmetrical electrode within said extension electrically connected to the inner of said coaxial conductors, said coupling being adapted to launch into said pipe or to receive therefrom electromagnetic waves of such field pattern that they are propagated through said pipe only at frequencies exceeding a critical frequency dependent on a transverse dimension of said pipe.

4. In combination, a wave guide comprising a metallic pipe containing a dielectric medium for the propagation of electromagnetic waves above a critical frequency dependent on a transverse dimension of said pipe, a two-wire line and coupling means interconnecting said line and said pipe in energy transfer relation, said coupling means comprising a pair of juxtaposed metallic members each conforming with a substantially conical surface coaxial with said pipe, said pair of members being electrically connected at one end to said line and toward the other end progressively separating from each other and increasing in circumferential dimension, whereby the impedance of said coupling means progressively changes from said one end toward the other.

5. An electromagnetic wave guide consisting of a cylindrical metallic pipe with an enclosed dielectric medium for the propagation of transverse magnetic waves above the cut-off frequency of said guide, a terminal structure for said guide comprising a pair of coaxial conical metallic members disposed with their larger ends facing the end of said guide, the outer of said members being in substantial continuation of said pipe, and a translating device electrically connected to the smaller ends of said members.

6. In combination, a wave guide consisting of a hollow pipe, a generator of electrical high frequency energy located within said wave guide and disposed between two conducting discs oriented perpendicularly to the axis of the guide, means for electrically connecting the two aforementioned discs to the generator to establish an alternating difference of potential between them and reflecting means axially spaced from the nearer of said discs a distance that is optimum for maximum guided wave output.

7. In combination, a uni-conductor wave guide comprising a tubular metallic pipe containing a gaseous dielectric medium, a generator of electrical high frequency energy located within said wave guide and disposed between two conducting discs oriented perpendicularly to the axis of the guide, means for electrically connecting the two aforementioned discs to the generator, and a reflector comprising an axially movable conducting disc with its plane perpendicular to the axis of the wave guide for controlling the effective length of said guide for maximum output.

8. A high frequency transmission system comprising transmitting and receiving terminals and a wave guide interconnecting them, said wave guide consisting essentially of a cylindrical metallic pipe, said transmitting terminal comprising a pair of axially spaced metallic discs within said pipe and coaxially positioned with respect thereto and a high frequency source connected between said discs, said source being adapted to operate at a frequency exceeding a critical frequency that is dependent on the diameter of said pipe and above which progressive electromagnetic waves are sustained within said pipe, and said receiving terminal comprising a pair of concentric metallic cones the outer of which is connected at its larger end to said pipe.

9. In combination, a wave guide consisting essentially of a cylindrical metallic pipe, a pair of metallic discs each disposed coaxially within and spaced from said pipe, a source of high frequency waves disposed between and connected to said discs, for launching in said pipe waves of a character such that transmission occurs only at frequencies above a critical frequency dependent on the transverse dimension of said pipe, and a reflector axially spaced from said discs.

10. In combination with a wave guide consisting of a metallic pipe for the transmission of waves of such character that the guide presents to them the characteristics of a high-pass filter, a pair of partial reflectors spaced apart axially within said pipe, a translating circuit connected to and between said partial reflectors, and means for establishing a high frequency field between said partial reflectors.

FREDERICK B. LLEWELLYN.